Figure 1:
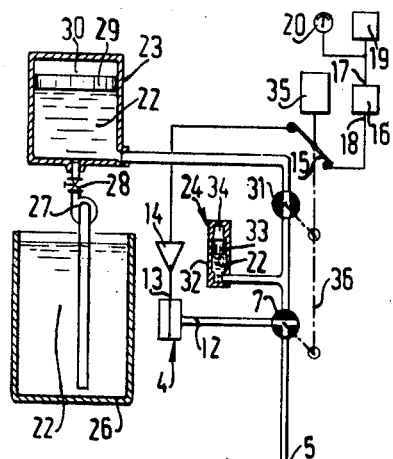

United States Patent [19]

van Zeggelaar

[11] 4,118,990

[45] Oct. 10, 1978

[54] METHOD AND DEVICE FOR MEASURING A PRESSURE IN A SUSPENSION CONDUIT

[75] Inventor: Gerrit Hendrik van Zeggelaar, Utrecht, Netherlands

[73] Assignees: Bagger en Grond (Amsterdam Ballast Dredging) Ballast-Nedam Groep N. V.; Amsterdamse Ballast B.V., Amstelveen, Netherlands

[21] Appl. No.: 786,958

[22] Filed: Apr. 12, 1977

[51] Int. Cl.² .............................................. G01L 7/00
[52] U.S. Cl. ........................................ 73/714; 73/756
[58] Field of Search .................. 73/395, 420, 53, 388, 73/706, 714, 756

[56] References Cited

U.S. PATENT DOCUMENTS 3,295,374  1/1967  Sawada et al. ......................... 73/395
3,771,365  11/1973  Schempp ................................ 73/395

Primary Examiner—Donald O. Woodiel

Attorney, Agent, or Firm—John P. Snyder

[57] ABSTRACT

In a method of measuring a pressure of a suspension, for example, slush, flowing through a suspension conduit, in which the pressure is transferred through a water-filled sensing duct, whose nozzle opening out in the suspension conduit is rinsed with water, to a pressure pick-up whose output signal is fed to recording and/or display apparatus, the sensing duct and/or the nozzle may become clogged, for example, by the deposition of algae of the rinsing water or the deposition of solid substance from the suspension.

In order to render the measurements more reliable the pressure is detected in a sensing zone withdrawn out of the suspension stream, where the risk of deposition of solid substances is limited, while the pressure is detected in consecutive measuring cycles, each including a rinsing phase and a pick-up phase of longer duration than the rinsing phase.

24 Claims, 6 Drawing Figures

U.S. Patent   Oct. 10, 1978   4,118,990

METHOD AND DEVICE FOR MEASURING A PRESSURE IN A SUSPENSION CONDUIT

The invention relates to a method of measuring a pressure of a suspension, for example, slush, flowing through a suspension conduit, in which the pressure is transferred through a water-filled sensing duct, whose nozzle opening out in the suspension conduit is rinsed with water, to a pressure pick-up whose output signal is fed to recording and/or display apparatus.

Such a method is known. In the known method the sensing duct and/or the nozzle may become clogged, for example, by the deposition of algae of the rinsing water or the deposition of solid substance from the suspension, which renders the measurements unreliable.

The invention has for its object to render the measurements more reliable. To this end, in accordance with the invention, the pressure is detected in a sensing zone withdrawn out of the suspension stream, where the risk of deposition of solid substances is limited, whilst the pressure is detected in consecutive measuring cycles, each including a rinsing phase and a pick-up phase of longer duration than the rinsing phase. Since rinsing is performed only for a short time, the quantity of rinsing water is small so that it is feasible to use very pure, algae-free rinsing water rather than normal drinking water.

In order for the display apparatus to remain satisfactorily readable and for the recorded signal to be integrated throughout the time of operation, whilst in each rinsing phase of each cycle the pressure is not picked up, it is preferred to store the output signal of the pressure pick-up at the end of the pick-up phase in a memory, said signal being applied to the recording and/or display apparatus during the next-following rinsing phase rather than the signal associated with the pressure in the rinsing phase.

The invention provides furthermore a device for measuring a pressure of a suspension flowing through a suspension conduit, said device comprising a suspension conduit, a pressure pick-up communicating through a sensing duct having a nozzle opening out in the suspension conduit with a sensing zone of the suspension conduit and having an output connected to recording and/or display apparatus and comprising means for flushing the nozzle, and being characterized in that the sensing zone is located in a sensing chamber arranged in the wall of the suspension conduit and withdrawn out of the suspension stream, in which sensing zone the deposition of solid substance is restricted and in that the rinsing means are provided with control-means for periodically rinsing the nozzle during short rinsing phases in consecutive measuring cycles.

The deposition of solid substances is limited in the sensing chamber, for example, if the sensing chamber has a bottom sloping down towards the suspension conduit.

The above-mentioned and further features will be described by way of example with reference to preferred embodiments of the method and device in accordance with the invention.

Figure 2:
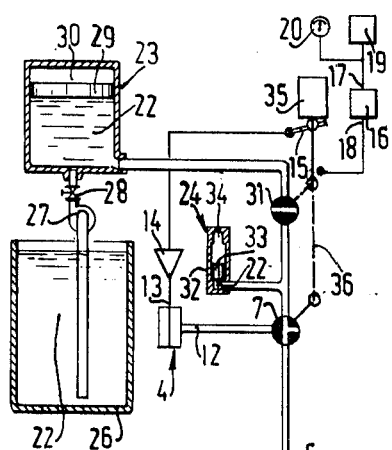
Figure 3:
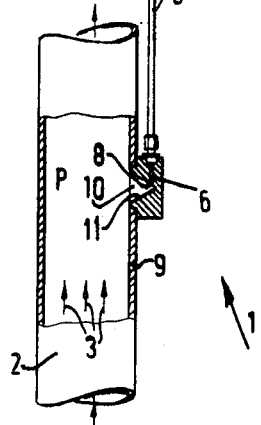

In the drawing:

FIGS. 1 and 2 show a circuit diagram of a device embodying the invention during a pick-up phase and a rinsing phase respectively in a method in accordance with the invention, FIG. 3 shows on an enlarged scale detail III of FIG. 1, and FIGS. 4, 5 and 6 show each a further variant of the detail of FIG. 3.

With the aid of the device 1 of FIGS. 1 and 2 the pressure P of a suspension stream, particularly a slush stream flowing through a suspension conduit 2 in the direction of the arrows 3 is measured in a reliable manner.

Slush contains readily settling sand of different grain size and, moreover, mire which is likely to stick in corners.

Figure 4:
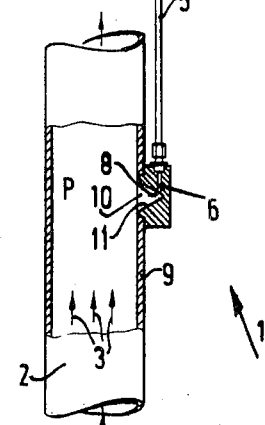

Apart from the suspension conduit 2 the device 1 comprises a pressure pick-up 4, which communicates through a sensing duct 5, a three-way cock 7 occupying the pick-up position shown in FIG. 1 and a connecting duct 12 with a nozzle 6 opening out in the suspension conduit 2 with a sensing zone 8 of the suspension conduit 2, said sensing zone 8 being located in a sensing chamber 10 arranged in the wall 9 of the suspension conduit 2 and being withdrawn out of the suspension stream, in which sensing zone 8 the deposition of solid substances is restricted since the sensing chamber 10 has a bottom 11 sloping down towards the suspension conduit 2, the sensing chamber 10 diverging towards the suspension conduit 2 and having a conical shape. The sensing duct 5 is preferably directed downwards to the sensing chamber 10 — although a transverse opening as shown in FIG. 4 is also possible — and preferably opens out near the tip of the conical sensing chamber 10. The sensing chamber 10 may have the shape of a cone having an apex $a$ of the order of 60°.

The electric output 13 of the pressure pick-up 4 is connected through an amplifier 14 and a closed switch 15 to a memory circuit 16 of a type such that at its output 17 the information last applied to the input 18 is always available at the output 17, for example, a memory circuitry of the sample and hold type. The output 17 is connected to a recording apparatus 19 and to an indicator 20 of the pressure P.

The slope of the bottom 11 of the sensing chamber 10 is too steep for allowing the deposition of solid substances, for example, grains of sand. In order to avoid adherence of sticky substance, for example, loam and mud in the sensing chamber 10 near the nozzle 6 the pressure P is detected in accordance with the invention in consecutive measuring cycles including each a rinsing phase and a pick-up phase of longer duration than the rinsing phase.

During the rinsing phase illustrated in FIG. 2 the nozzle 6 is flushed with pure water 2 from a hydrophore 23, which communicates through a metering regulator 24 with the sensing duct 5. The hydrophore 23 is fed from a reservoir 26 of pure water 22, for example, distilled water or an algae-killing liquid by means of a pump 27 through a closing member 28. The hydrophore 23 comprises a gas cushion 30 compressed above a piston 29 and pushing a quantity of water 22 metered in the holder 32 as far as below the gas cushion 34 enclosed by a piston 33 in the open position shown in FIG. 1 of the closing member 31 of the quantity regulator 24 and of the three-way cock 7 blocking the quantity regulator 24. In the positions shown in FIG. 2 of the closing member 31 and of the three-way cock 7 said metered, small quantity of water 22 of, for example, 1 cubic cm flows through the nozzle 6 and thus cleans the sensing duct 5, the nozzle 6 and the sensing chamber 10.

The device 1 comprises a programme switch 35 controlling the measuring cycles, which actuates through a rod 36 simultaneously the closing member 31, the three-way cock 7 and the electric switch 15 between the positions of FIGS. 1 and 2, so that it provides a control of the rinsing means for periodically rinsing the nozzle 6 during short rinsing phases, for example, of 2 sec in consecutive measuring cycles of, for example, 60 sec.

During the rinsing operation the sensing zone 8 may have a different, for example, higher pressure than the real pressure P of the suspension. Therefore, during the rinsing phase the switch 15 is opened so that the last information of the preceding pick-up phase is applied by the memory circuitry 16 to the recording apparatus 19 and the indicator 20.

Figure 5:
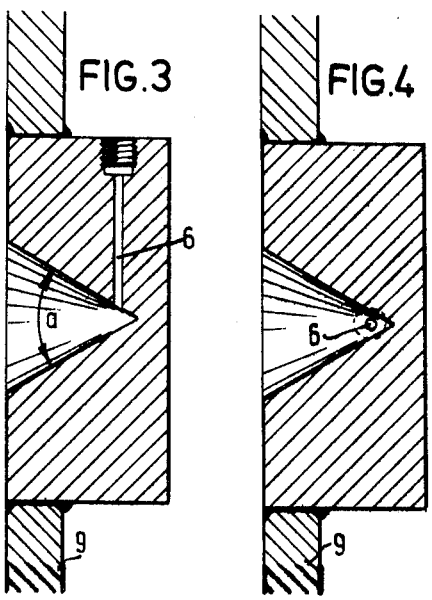

In the variant shown in FIG. 5 the sensing chamber 10 is formed by a bore of a diameter b of, for example, 30 cms, which is wide as compared with the bore of the nozzle 6 and by a sensing duct 5 of 1 to 2 mms, preferably 1.5 mms. The steep slope of the bottom 11 of the sensing chamber 10 prevents the deposition of grains of sand or the like.

Figure 6:
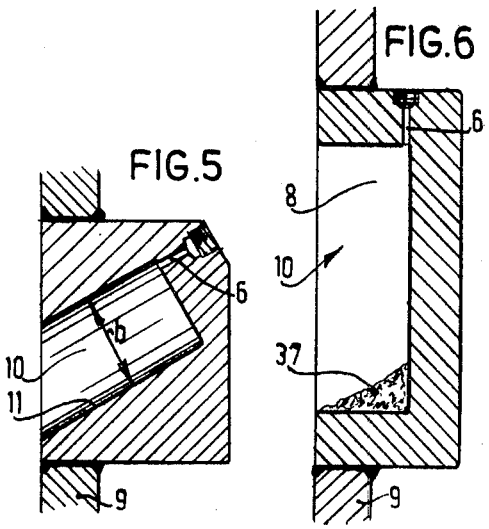

In the variant of FIG. 6 deposition of sand 37 on the bottom of the sensing chamber 10 is, indeed, possible, but the sensing zone 8 is located in the top part of the sensing chamber 10, where sand cannot be deposited.

What I claim is:

1. In a suspension conveying system including a suspension conduit having a pressure sensing chamber formed in a wall portion thereof, the combination of:
   a nozzle passage opening into said pressure sensing chamber and a duct connected to said passage;
   rinsing means for supplying liquid under sufficient pressure to overcome the pressure in said conduit;
   pressure-sensing means for sensing pressure in said conduit through said duct;
   recording and/or indicating means connected to said pressure-sensing means for recording and/or indicating the pressure sensed by said pressure-sensing means; and
   control means for periodically connecting said rinsing means to said nozzle passage through said duct for time durations each of which is small in comparison with the control period.

2. A system as claimed in claim 1 wherein said pressure sensing chamber comprises a bottom sloping down towards the suspension conduit.

3. A system as claimed in claim 2 wherein said pressure sensing chamber diverges towards the suspension conduit.

4. A system as claimed in claim 3 wherein said duct is directed downwards to the sensing chamber.

5. A system as claimed in claim 4 wherein said sensing chamber is conical.

6. A system as claimed in claim 5 wherein said nozzle passage opens out near the tip of said conical sensing chamber.

7. A system as claimed in claim 6, wherein said sensing chamber has a vertex in the order of 60°.

8. A system as claimed in claim 1 wherein said rinsing means comprises a hydrophore communicating with said sensing duct through a quantity regulator.

9. In a suspension conveying system including a suspension conduit having a pressure sensing chamber formed in a wall portion thereof, the combination of:
   a nozzle passage opening into said pressure sensing chamber and a duct connected to said passage;
   rinsing means for supplying liquid under sufficient pressure to overcome the pressure in said conduit;
   pressure-sensing means for sensing pressure in said conduit through said duct;
   recording and/or indicating means connected to said pressure-sensing means for recording and/or indicating the pressure sensed by said pressure-sensing means; and
   control means for alternately connecting said rinsing means and said pressure-sensing means to said nozzle passage through said duct.

10. In a system as defined in claim 9 wherein said control means includes mechanism for connecting said duct to said rinsing means while disconnecting said duct from said pressure-sensing means and visa versa wherein the durations of connection of said rinsing means are shorter than the duration of said connection of said pressure-sensing means to said duct.

11. A system as claimed in claim 10 wherein said sensing chamber is conical.

12. A system as claimed in claim 11 wherein said nozzle passage opens out near the tip of said conical sensing chamber.

13. A system as claimed in claim 12 wherein said sensing chamber has a vertex in the order of 60°.

14. A system as claimed in claim 9 wherein said means for alternately connecting comprises a programme switch for controlling the duration of the connection of said pressuresensing means and rinsing means to said nozzle passage.

15. A system as claimed in claim 9 wherein said system includes a memory means for storing pressure sensed by said sensing means, and means for applying the stored pressure to said recording and/or indicating means during a succeeding rinsing phase.

16. A method for measuring the pressure of a suspension, for example, slush, flowing through a suspension conduit, comprising the steps of:
   (a) sensing the pressure in said conduit remotely through a duct; and
   (b) periodically flushing said duct by flowing liquid under pressure through said duct and into said conduit, the duration of each flushing step being small in comparison with the period between successive flushing steps.

17. A method as defined in claim 16 including the step of blocking the sensing of pressure in the conduit during each flushing step (b).

18. A method as defined in claim 17 including the step of recording and/or displaying the pressure sensed in step (a).

19. A method as defined in claim 16 including the step of recording and/or displaying the pressure sensed in step (a).

20. A method as defined in claim 19 including the step of storing the pressure sensed at the end of each sensing step and recording and/or displaying it during the next succeeding flushing step.

21. A method as defined in claim 18 including the step of storing the pressure sensed at the end of each sensing step and recording and/or displaying it during the next succeeding flushing step.

22. A method for measuring the pressure of a suspension, for example, slush, flowing through a suspension conduit, comprising the steps of:
   (a) periodically sensing the pressure in said conduit remotely through a duct;

(b) recording and/or indicating the pressure sensed during the periods of step (a);

(c) periodically flushing said duct by flowing liquid under pressure through said duct and into said conduit;

(d) controlling steps (a) and (c) such that each sensing step (a) is immediately followed by a flushing step (c).

23. A method as defined in claim 22 wherein step (d) controls the periods of steps (a) and (c) such that each period of step (a) is of larger duration than each period of step (c).

24. A method as defined in claim 23 including the further step of storing the pressure sensed at the end of each sensing period and recording and/or indicating it during the next succeeding flushing step.

* * * * *